July 21, 1936.   B. A. WITTKUHNS ET AL   2,047,988
POSITIONAL CONTROL OF A PONDERABLE OBJECT FROM A CONTROL ELEMENT
Filed June 29, 1934   2 Sheets-Sheet 1

INVENTORS
BRUNO A. WITTKUHNS
and
HARVARD L. HULL
BY
Herbert H. Thompson
THEIR ATTORNEY

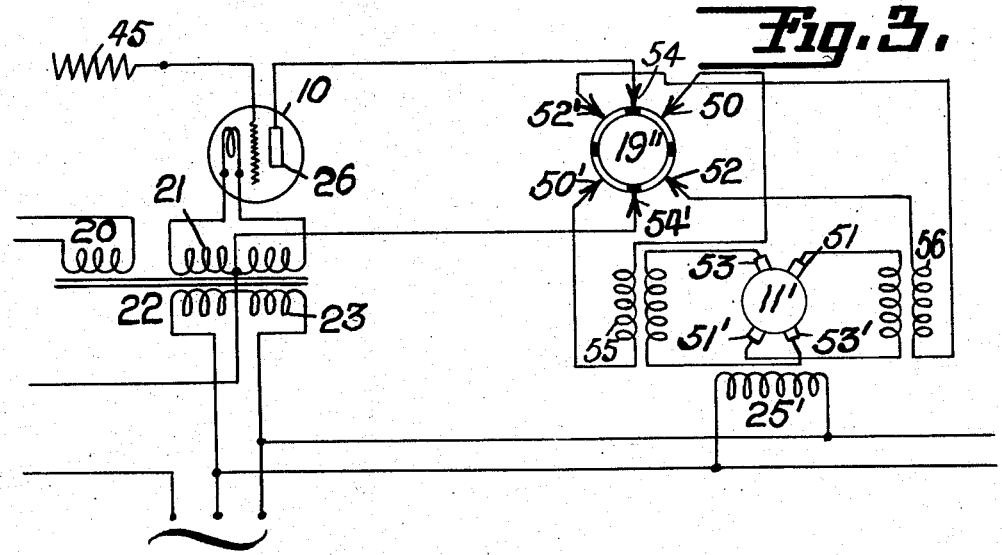

Patented July 21, 1936

2,047,988

UNITED STATES PATENT OFFICE 2,047,988

POSITIONAL CONTROL OF A PONDERABLE OBJECT FROM A CONTROL ELEMENT

Bruno A. Wittkuhns, Summit, and Harvard L. Hull, Leonia, N. J., assignors to Sperry Gyroscope Company, Inc., Brooklyn, N. Y., a corporation of New York Application June 29 1934, Serial No. 733,028

11 Claims. (Cl. 172—239)

This invention relates to the positional control of an object from a sensitive controller such as employed in follow-up systems for sensitive instruments or for the remote control of comparatively heavy objects, such as searchlights or guns. In most such systems a pair of oppositely acting electronic, preferably grid glow, tubes are employed, the differential output of which drives a reversible power motor in either direction to position the object. Many difficulties with this circuit could be avoided if the same tube could be employed for operating the motor in both directions and we are aware that one such system has been proposed. According to this prior system a pair of synchronously driven commutator devices is employed, one of which periodically reverses the phase of the signal supplied to the grid, and the other of which simultaneously and sequentially transfers the output of the tube system to one of two opposed windings which control the direction, torque and speed of the motor. This system has several disadvantages, however, among which is the requirement of very high insulation resistance of the input commutator on account of the high resistance of the tube, so that any slight lessening of the resistance due to dirty contacts or the like causes the amplifier to fail completely.

According to our invention we propose to eliminate the input commutator and employ only an output commutator, or an output commutator and a bias voltage commutator. According to our system, our output commutating device not only commutates the output from the plate with respect to a motor winding so as to rapidly and periodically tend to drive the same first in one and then in the other direction, but also simultaneously reverses the conditions under which said tube becomes conductive and non-conductive for any given signal from the controller. By this means a simpler circuit is provided which is less likely to become deranged.

Referring to the drawings,

Fig. 3 is a modified wiring diagram showing our invention as applied to the control of a repulsion motor.

Figure 1:
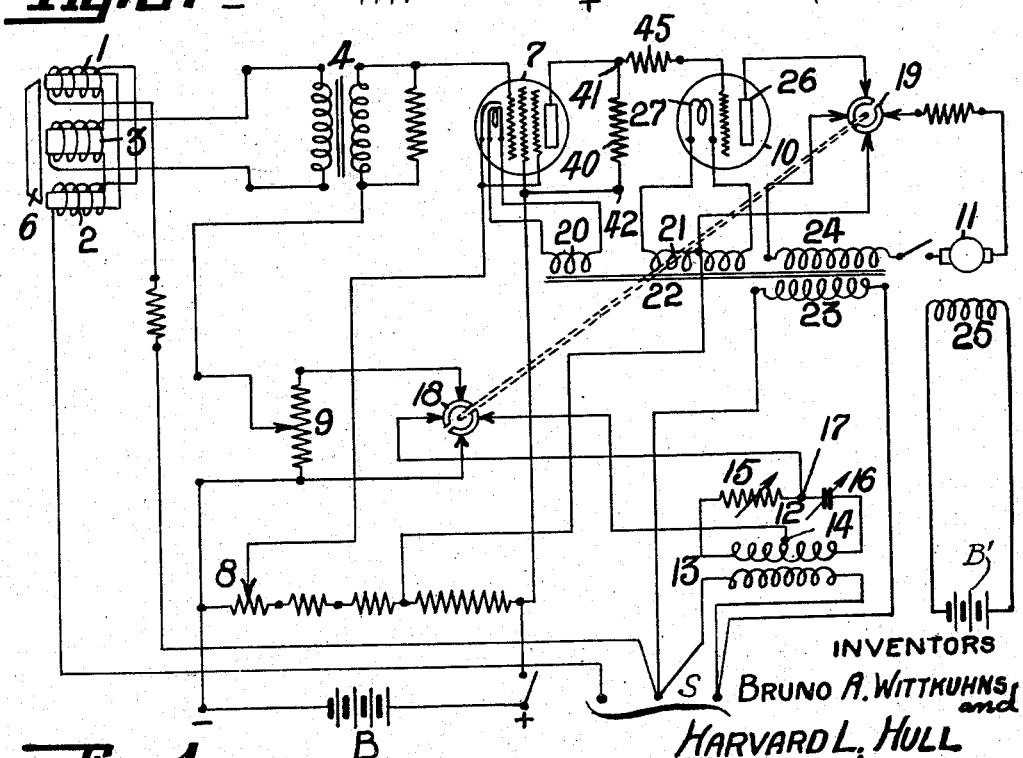
Fig. 1 is a wiring diagram of one form our invention may assume.

Fig. 1 shows a follow-up system wherein alternating current signals of variable magnitude and reversible direction (or 180° phase position) are utilized to control a reversible motor. Such a system is especially adapted for driving the follow-up systems of gyro compasses and, in general, is shown in the prior application of Francis L. Moseley for Phase shift control for grid-controlled rectifier tubes, Serial No. 679,589, filed July 8, 1933. According to this system a small transformer is used to supply the signal voltages, said transformer having two oppositely wound primaries 1 and 2 connected to one phase of a polyphase supply S, and the secondary winding 3 supplying the signal to the step-up transformer 4, the output of the winding 3 being controlled in magnitude and direction by varying the magnetic flux through the winding in accordance with the relative position of the controlling and following elements, the windings being preferably on the latter and the separate armature 6 on the former. The secondary of the transformer 4 is connected to the first stage thermionic or vacuum tube 7. Said tube is normally biased to an inoperative condition by means of a resistance network 8 across the direct current supply B. As explained in the aforesaid application of Francis L. Moseley, it is preferable to place a graduated phase shift control on the grid of the grid glow tube 10 which controls the power motor 11. For this purpose there is shown a phase shifting bridge 12, the current for which may be supplied from a transformer 13 having a center tap 14 upon the secondary thereof, and the secondary having connected across the terminals thereof a variable resistance 15 and a variable capacitance 16, the output being taken from the center tap 14 and from a mid point 17 between the resistance and capacitance. This bias voltage, which may be of 90° or preferably more, is added to the input voltage to the grid of the tube 7 by being connected in series with the D. C. bias supplied by the D. C. source B and is connected through the secondary of transformer 4 to the grid of tube 7. As hereinafter explained in detail, it is necessary to commutate the A. C. grid bias voltage, which may be effected by commutator 18 driven synchronously with the main output commutator 19 and with the A. C. supply, both commutators forming the commutating device in this form of the invention. Tube 7 is shown as of the triple grid type having the characteristic of sharp plate current cut-off with respect to grid voltage. The phase shift serves to time the operation of the vacuum tube by swinging its grid alternately positive and negative at definite and controllable times in each cycle, somewhat as explained in the aforesaid application of Francis L. Moseley. When positive, tube 7 is rendered conductive and plate current passes through the resistance 40, which is high with respect to series resistance 45, causing point 41 to become negative with respect to point 42. This negative drop is communicated to a grid controlled gas filled rectifier tube 10, which may be referred to merely as a grid glow tube, through resistance 45, and serves to bias it to an inoperative position. In like manner, when the grid of tube 7 is made negative its plate current is reduced to zero, and hence the grid of tube 10 assumes the potential of point 42 and is thereby rendered conductive for the remainder of the half cycle under consideration. Between these two extreme conditions, the output varies gradually with the potential on the grid, or in other words, a phase control of the output of the grid glow tube is secured which is responsive to the amplitude and direction of the voltage applied by the signal. The output of tube 7 is shown as connected to the grid of the grid glow tube 10, the heater current for both tubes being supplied from extra secondaries 20 and 21 on the transformer 22, the primary of said transformer 23 being excited from one phase of the supply.

A third secondary 24 of said transformer is shown as supplying the current to the reversible motor 11. Said motor is shown as of the commutator D. C. type, the field 25 of which may be separately excited as from source B', which may be the same or different from the source B. The output commutator 19 is placed in circuit between secondary 24, motor 11, and the plate 26 of tube 10, so that a double function is accomplished. Firstly, the A. C. voltage on the plate 26 is alternately reversed in phase or displaced 180° by periodically reversing the connections of the coil 24 to the plate 26 and the cathode 27 of the tube. The result is that a signal of one phase on the grid will drive the motor in one direction, while a signal of opposite phase will drive the motor in the opposite direction and the current in each direction will be a function of the magnitude of the signal, smooth control being accomplished by the gradual phase shift of the voltage applied to the grid. Thus, with the commutator in the position shown in Fig. 1, the left hand end of the coil 24 is connected to the plate 26 while the right hand end is connected to the cathode through the armature 11. If the commutator is revolved 90° in a clockwise direction, the right hand end of said coil will be connected to the plate and the left hand end to the filament. A further 90° movement will result in the same connections as first described, so that there are two reversals per revolution of the commutator.

An analysis of the circuit will show that it is necessary to also commutate the A. C. bias voltage, as otherwise the grid glow tube would be unequally controlled in the two directions. The commutator 18 effects this purpose, as will be readily apparent, by alternating connecting point 17 on the phase shifting bridge 12 first to the grid and then to the filament of the tube 7, and conversely for the point 14 of said bridge, variable resistance 9 controlling the amount of the voltage applied to the grid.

Figure 2:
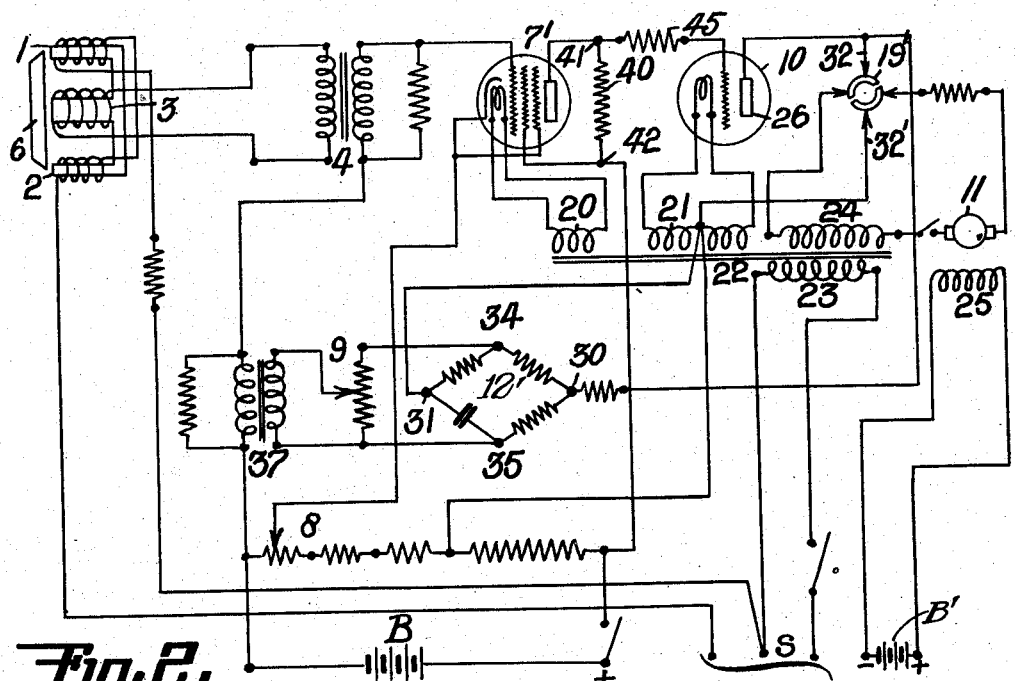
Fig. 2 is a similar diagram of a modified form employing only an output commutator.

A still further simplification is shown in Fig. 2, in which the extra A. C. bias commutator 18 is eliminated and this function is accomplished by one commutator. In this figure the same parts are correspondingly numbered and parts not identical but similar in function are given the same number, primed, as in Fig. 1.

The primary motor control circuit from the tube 10 may remain as before, the commutator 19' acting in this respect the same as the commutator 19. In this case, however, the source of the A. C. bias 12' is shown as a resistance capacity bridge, the input points of which, 30, 31, are connected respectively to the same brushes 32 and 32' on commutator 19' as is the output from the tube 10. In other words, the A. C. voltage supplied by secondary winding 24 is commutated before reaching the bridge and the output of the bridge as taken off from points 34 and 35 is coupled through a transformer coupler 37 to the grid circuit of tube 7'. By this means only one commutator need be employed and the reversible motor may be controlled as to speed and direction from a single signal which varies in magnitude and polarity or phase only. It will be understood that the commutator or commutators are preferably driven in synchronism with the frequency of the A. C. supply so that the breaks may occur at zero potential.

It may also be observed that by our invention an ordinary commercial D. C. motor having only the usual single armature and single field winding may be controlled, since our invention reverses the direction of current flow through one of these windings and the other may be separately excited from a D. C. source. In prior systems on the other hand, it has been necessary to employ an extra winding on either the armature or the field in order to reverse the same.

Our invention is equally well adapted to the control of an A. C. repulsion motor in accordance with the general scheme outlined in the prior application of Francis L. Moseley, Serial No. 689,075, filed September 12, 1933, for the remote control of heavy objects. Fig. 3 illustrates how a repulsion motor may be controlled from a single grid glow tube and single commutator according to our invention, the circuit in this figure being the same as in Fig. 2 to the left of the tube 10 and secondary 20 of transformer 22, and therefore not repeated. According to this system the field 25' of the repulsion motor is continuously excited from the A. C. supply and the two pairs of short-circuiting brushes on the commutator of the armature 11' are alternately short-circuited by short-circuiting the secondaries of transformers 55 and 56 through the tube 10 and the secondary 21 of transformer 22 by means of the commutator 19'' in circuit between the tube 10, winding 21 and transformers 55 and 56. In this case the commutator is shown as having four sections and six brushes, two of the brushes, 50 and 50', being connected across the secondary of transformer 55, the primary of which is connected across brushes 53 and 53' and another pair of brushes on commutator 19'', i. e., 52 and 52', being connected across the transformer 56 which is across the opposing pair of motor brushes 53, 53'. A third pair of brushes 54, 54' is connected in the plate-transformer circuit 26, 21. In this circuit the tube and transformers act as a variable resistance shunted across the brushes, as explained more fully in the copending application of Francis L. Moseley, and the plate 26 of the tube and the motor connections are alternately reversed, as in the other form of the invention, to cause the flux through the armature to flow first in one direction and then in the other.

It will be understood, of course, that in all forms of the invention the opposing alternating current impulses are equal and opposite when no signal is, or balanced signals are, being received and that an unbalanced signal in one direction causes the current in alternate cycles to prevail in proportion to the phase shift on the grid, while the reverse takes place for a signal in the opposite direction.

In acordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a remote positional control, the combination with a reversible motor having an armature and a field part, a controller, the signal of which varies in magnitude and direction, and an A. C. supply, of an electron tube between said controller and motor and arranged to have its plate energized from said supply, a constantly driven commutator included in the connection between said supply and the plate of said tube for switching the output of said tube tending to cause a flux in one part of said motor first of one polarity and then the other, and for synchronously reversing the phase of the voltage supplied to the plate of said tube the other part of said motor being supplied with a uni-directional flux.

2. In a remote positional control, the combination with a reversible motor having an armature and a field part, a controller, the signal of which varies in magnitude and direction, and an A. C. supply, of a grid glow tube between said controller and motor and arranged to have its plate energized from said supply, a constantly driven commutating device included in the connection between said supply and the plate of said tube for switching the output of said tube tending to cause a flux in one part of said motor first of one polarity and then the other, and for synchronously reversing the conditions under which said tube becomes conductive and non-conductive for given input signals, the other part of said motor being supplied with a uni-directional flux.

3. As a means for actuating a reversible motor from an A. C. controller, the signal of which varies in magnitude and direction, a grid glow tube having grid and plate circuits, means for controlling the phase in the grid circuit of said tube, said means including means for commutating the plate circuit to tend to drive said motor first in one and then the other direction, and for synchronously reversing the conditions under which said tube becomes conductive and non-conductive for given input signals, whereby the motor is driven in the direction dictated by the direction of said signal.

4. In a remote control for reversible motors, the combination with a controller which produces an A. C. signal which varies in magnitude and phase, of a grid glow tube having its grid controlled from said signal and its plate circuit for driving said motor, and a constantly driven commutating device in said circuit for periodically reversing the connections to a winding of said motor, and for simultaneously reversing the phase on the plate.

5. In a remote control for reversible motors, the combination with a controller which produces an A. C. signal which varies in magnitude and direction, of an electron tube circuit controlled therefrom including a grid glow tube, a phase biasing device for combining with said signal to gradually shift the phase on the grid of said grid tube, and a constantly driven commutator device for periodically reversing the phase on the plate of said tube, for simultaneously reversing the input of said phase biasing device and for simultaneously reversing the connections to a winding of said motor.

6. In an A. C. remote positional control, the combination with a reversible repulsion motor having opposing pairs of brushes for driving the same in either direction, a controller, the signal of which varies in magnitude and direction, and an A. C. supply, of a grid glow tube having its cathode-plate circuit energized from said supply, and a transformer fed from said supply between said controller and motor, a constantly driven commutator for switching the plate circuit of said tube and transformer to close a low resistance circuit across first one and then the other pair of reversing brushes on the armature of said motor and for simultaneously reversing the conditions under which said tube becomes conductive and non-conductive for given input signals.

7. A remote control system as claimed in claim 3, in which the reversible motor is of the A. C. repulsion type with opposing pairs of brushes thereon, and the grid glow tube acts to alternately short-circuit said opposing pairs of brushes.

8. In an A. C. remote control for ordinary D. C. motors having single armature and field windings, the combination with a controller which produces an A. C. signal that varies in magnitude and direction and an A. C. supply and a separate source of D. C. for one of said motor windings, of a grid glow tube having its grid controlled from said signal and its plate in circuit with one of said windings, a transformer excited from said supply, the secondary of which is also in said plate and motor winding circuit, and a constantly driven commutating device also in said circuit for periodically reversing the connections between said plate and the transformer and motor, whereby said motor is continuously in effect reversed and the phase on the plate likewise reversed.

9. As a means for actuating a reversible motor from an A. C. controller, the signal of which varies in magnitude and direction, a grid glow tube having grid and plate circuits, means for controlling the phase in the grid circuit from said signal, including a bias voltage device, means for commutating the plate circuit to tend to drive said motor first in one and then the other direction, for commutating said bias device and for synchronously reversing the conditions under which said tube becomes conductive and non-conductive for given input signals, whereby the motor is driven in the direction dictated by the direction of said signal.

10. In a remote control for reversible motors, the combination with a controller which produces an A. C. signal which varies in magnitude and direction, of an electron tube circuit controlled therefrom including a grid glow tube, a phase biasing device for combining with said signal to gradually shift the phase on the grid of said grid tube, a constantly driven commutator device for periodically reversing the phase on the plate of said tube and for simultaneously reversing the connections to a winding of said motor, and a synchronously driven commutator device for periodically reversing the phase output of said phase biasing device.

11. In a remote control for reversible motors, the combination with a controller which produces an A. C. signal which varies in magnitude and direction, of an electron tube circuit controlled therefrom including a grid glow tube, a phase biasing device for combining with said signal to gradually shift the phase on the grid of said grid tube, and a constantly driven commutator device for periodically reversing the phase on the plate of said tube, for simultaneously reversing the output of said phase biasing device and for simultaneously reversing the connections to a winding of said motor.

BRUNO A. WITTKUHNS.
HARVARD L. HULL.